(12) United States Patent
Yamanaka et al.

(10) Patent No.: US 9,815,464 B2
(45) Date of Patent: Nov. 14, 2017

(54) CONTROLLER OF VEHICLE

(71) Applicant: TOYOTA JIDOSHA KABUSHIKI KAISHA, Toyota-shi (JP)

(72) Inventors: Satoshi Yamanaka, Susono (JP); Takahiro Yokokawa, Susono (JP); Yoshio Ito, Susono (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 15/034,419

(22) PCT Filed: Nov. 7, 2014

(86) PCT No.: PCT/JP2014/080128
§ 371 (c)(1),
(2) Date: May 4, 2016

(87) PCT Pub. No.: WO2015/068857
PCT Pub. Date: May 14, 2015

(65) Prior Publication Data
US 2016/0272208 A1    Sep. 22, 2016

(30) Foreign Application Priority Data

Nov. 8, 2013    (JP) .................................. 2013-232083

(51) Int. Cl.
*B60W 30/18*    (2012.01)
*B60W 30/19*    (2012.01)
(Continued)

(52) U.S. Cl.
CPC ............ *B60W 30/18* (2013.01); *B60W 10/02* (2013.01); *B60W 10/06* (2013.01); *B60W 10/10* (2013.01);
(Continued)

(58) Field of Classification Search
CPC ...... B60W 10/02; B60W 10/06; B60W 10/10; B60W 10/11; B60W 30/19; B60W 30/18072; B60W 30/18
See application file for complete search history.

(56) References Cited

U.S. PATENT DOCUMENTS 5,468,196 A * 11/1995 Minowa ................ B60W 10/02
477/107
6,502,681 B1 * 1/2003 Ota .................... B60W 30/1819
192/103 R
(Continued)

FOREIGN PATENT DOCUMENTS

DE    10 2010 003 673 A1    10/2011
JP    2011-183963 A    9/2011
(Continued)

OTHER PUBLICATIONS

International Search Report dated Apr. 13, 2015 in PCT/JP14/080128 Filed Nov. 7, 2014.

*Primary Examiner* — Jacob S Scott
*Assistant Examiner* — Tinh Dang
(74) *Attorney, Agent, or Firm* — Oblon, McClelland, Maier & Neustadt, L.L.P.

(57) ABSTRACT

A controller of a vehicle that includes a return control unit configured to carry out a complete engagement control of a power connecting/disconnecting device. At the time a return condition from inertia traveling to normal traveling is established and a down shift of an automatic transmission is requested, the return control unit carries out a down shift control of the automatic transmission so that a difference between an increasing gradient of a rotating speed of a first engaging portion and an increasing gradient of a rotating speed of a second engaging portion is within a predetermined range. At the time it can be regarded that the rotating speed of the first engaging portion and the rotating speed of
(Continued)

the second engaging portion are synchronized, the return control unit completely engages the power connecting/disconnecting device.

4 Claims, 4 Drawing Sheets

(51) Int. Cl.
*B60W 10/02* (2006.01)
*B60W 10/06* (2006.01)
*B60W 10/10* (2012.01)
*B60W 10/11* (2012.01)

(52) U.S. Cl.
CPC ...... *B60W 10/11* (2013.01); *B60W 30/18072* (2013.01); *B60W 30/19* (2013.01); *B60W 2030/1809* (2013.01); *B60W 2510/025* (2013.01); *B60W 2510/0241* (2013.01); *B60W 2510/0638* (2013.01); *B60W 2510/0652* (2013.01); *B60W 2510/102* (2013.01); *B60W 2510/1015* (2013.01); *B60W 2710/021* (2013.01); *B60W 2710/0644* (2013.01); *B60W 2710/0661* (2013.01); *B60W 2710/1005* (2013.01); *B60W 2710/1011* (2013.01); *B60W 2710/1016* (2013.01); *Y02T 10/76* (2013.01)

(56) References Cited

U.S. PATENT DOCUMENTS

| | | | | |
|---|---|---|---|---|
| 6,740,005 B2* | 5/2004 | Kato | ................... | B60W 10/06 |
| | | | | 477/107 |
| 6,939,265 B2* | 9/2005 | Rustige | ................ | B60W 10/02 |
| | | | | 477/175 |
| 8,187,149 B2* | 5/2012 | Koenig | ............... | B60W 10/115 |
| | | | | 477/115 |
| 8,246,506 B2* | 8/2012 | Matsubara | ............. | B60K 6/365 |
| | | | | 477/118 |
| 9,409,576 B2* | 8/2016 | Kuroki | ............... | B60W 10/184 |
| 2004/0138027 A1 | 7/2004 | Rustige et al. | | |
| 2011/0313631 A1 | 12/2011 | Roth | | |
| 2015/0291165 A1* | 10/2015 | Mitsuyasu | ...... | B60W 30/18172 |
| | | | | 701/54 |

FOREIGN PATENT DOCUMENTS

| | | |
|---|---|---|
| JP | 2012-13186 A | 1/2012 |
| JP | 2012-149710 A | 8/2012 |
| WO | 2014/090545 A1 | 6/2014 |

* cited by examiner

CONTROLLER OF VEHICLE

TECHNICAL FIELD

The invention relates to a controller of a vehicle that controls a drive force during traveling.

BACKGROUND ART

Conventionally, in vehicles, there is known, as a technique for reducing fuel consumption during traveling, inertia traveling for causing a vehicle to travel by inertia by disconnecting the power transmission between an engine and driving wheels during traveling. The controller disconnects the power transmission between the engine and the driving wheels by releasing a clutch in an engaged state interposed therebetween during normal traveling and causes the vehicle to shift to the inertia traveling. Further, when the inertia travelling is returned to the normal traveling, the controller engages the clutch in the released state. For example, Patent Literatures 1 and 2 described below disclose a technique as to the inertia traveling. Further, Patent Literature 3 described below discloses a technique for prohibiting the gear shift control of a transmission when the engine side rotating speed of a clutch exceeds a predetermined rotating speed during an inertia control.

CITATION LIST

Patent Literatures

Patent Literature 1: Japanese Patent Application Laid-open No. 2012-149710
Patent Literature 2: Japanese Patent Application Laid-open No. 2011-183963
Patent Literature 3: Japanese Patent Application Laid-open No. 2012-013186

DISCLOSURE OF INVENTION

Problems to be Solved by the Invention

Incidentally, the return from the inertia traveling to the normal traveling is carried out when a driver carries out an accelerator operation. Thus, when the return is requested, a down shift of a transmission may be requested at the same time. To suppress the generation of shock in engagement, a clutch is completely engaged after the difference between rotating speeds becomes equal to or less than a predetermined rotating speed. For example, when the clutch is interposed between an engine and a transmission, a time may be necessary until the rotating speed on the transmission side in the clutch (which increases due to the down shift) approaches the rotating speed on the engine side therein depending on the timing at which the down shift is carried out. Further, a drive force becomes insufficient for an accelerator operation depending on the timing at which the down shift is carried out. Thus, when the down shift is not carried out at an appropriate timing, there is a possibility that a driver has uncomfortable feelings that acceleration to an accelerator operation is slow.

Accordingly, a purpose of the invention is to improve the disadvantage of the conventional examples and to provide a controller of a vehicle capable of securing acceleration responsiveness while suppressing the generation of shock when a clutch is engaged.

Solutions to the Problems

A controller of a vehicle according to the present invention that includes an engine, an automatic transmission, and a power connecting/disconnecting device having a first engaging portion connected to the engine side and a second engaging portion connected to the automatic transmission side, the controller includes an inertia control unit configured to cause the vehicle to carry out inertia traveling by disconnecting the power transmission between the engine and driving wheels by releasing the power connecting/disconnecting device during normal traveling; and a return control unit configured to carry out an output control of the engine and carry out a complete engagement control of the power connecting/disconnecting device at the time a return condition from the inertia traveling to the normal traveling is established, wherein at the time the return condition from the inertia traveling to the normal traveling is established and a down shift of the automatic transmission is requested, the return control unit carries out a down shift control of the automatic transmission so that the difference between an increasing gradient of a rotating speed of the first engaging portion due to the output control of the engine and an increasing gradient of a rotating speed of the second engaging portion due to the down shift of the automatic transmission is within a predetermined range, and at the time the rotating speed of the first engaging portion and the rotating speed of the second engaging portion are synchronized or at the time it can be regarded that the rotating speed of the first engaging portion and the rotating speed of the second engaging portion are synchronized, the return control unit completely engages the power connecting/disconnecting device.

In the controller of the vehicle, it is preferable to include a gear shift timing calculating unit configured to calculate a start timing of the down shift control of the automatic transmission so that the increasing gradient of the rotating speed of the first engaging portion due to the output control of the engine and the increasing gradient of the rotating speed of the second engaging portion due to the down shift of the automatic transmission are synchronized, wherein the return control unit starts the down shift control of the automatic transmission at the start timing calculated by the gear shift timing calculating unit.

In the controller of the vehicle, it is preferable that at the time the state that a difference between the rotating speed of the first engaging portion and the rotating speed of the second engaging portion is equal to or less than a predetermined value continues for a predetermined time, the return control unit completely engages the power connecting/disconnecting device.

Effects of the Invention

Since the controller of the vehicle according to the invention carries out the down shift control of the automatic transmission so that an increasing gradient of a rotating speed of the second engaging portion is synchronized with an increasing gradient of a rotating speed of the first engaging portion, a waiting time until the power connecting/disconnecting device can be completely engaged after the return control is started can be reduced. At the time the respective rotating speeds are synchronized or at the time it can be regarded that the respective rotating speeds are synchronized, the controller completely engages the power connecting/disconnecting device. Accordingly, the controller can suppress the slowness of acceleration of the vehicle to the accelerator operation of a driver while suppressing the generation of shock when the power connecting/disconnecting device is completely engaged.

DESCRIPTION OF EMBODIMENTS

An embodiment of a controller of a vehicle according to the invention will be explained below in detail based on the drawings. Note that the invention is not restricted by the embodiment.

Embodiment

An embodiment of a controller of a vehicle according to the invention will be explained based on FIG. 1 to FIG. 4.

First, an example of a vehicle as an object to which the controller is applied will be explained.

Figure 1:
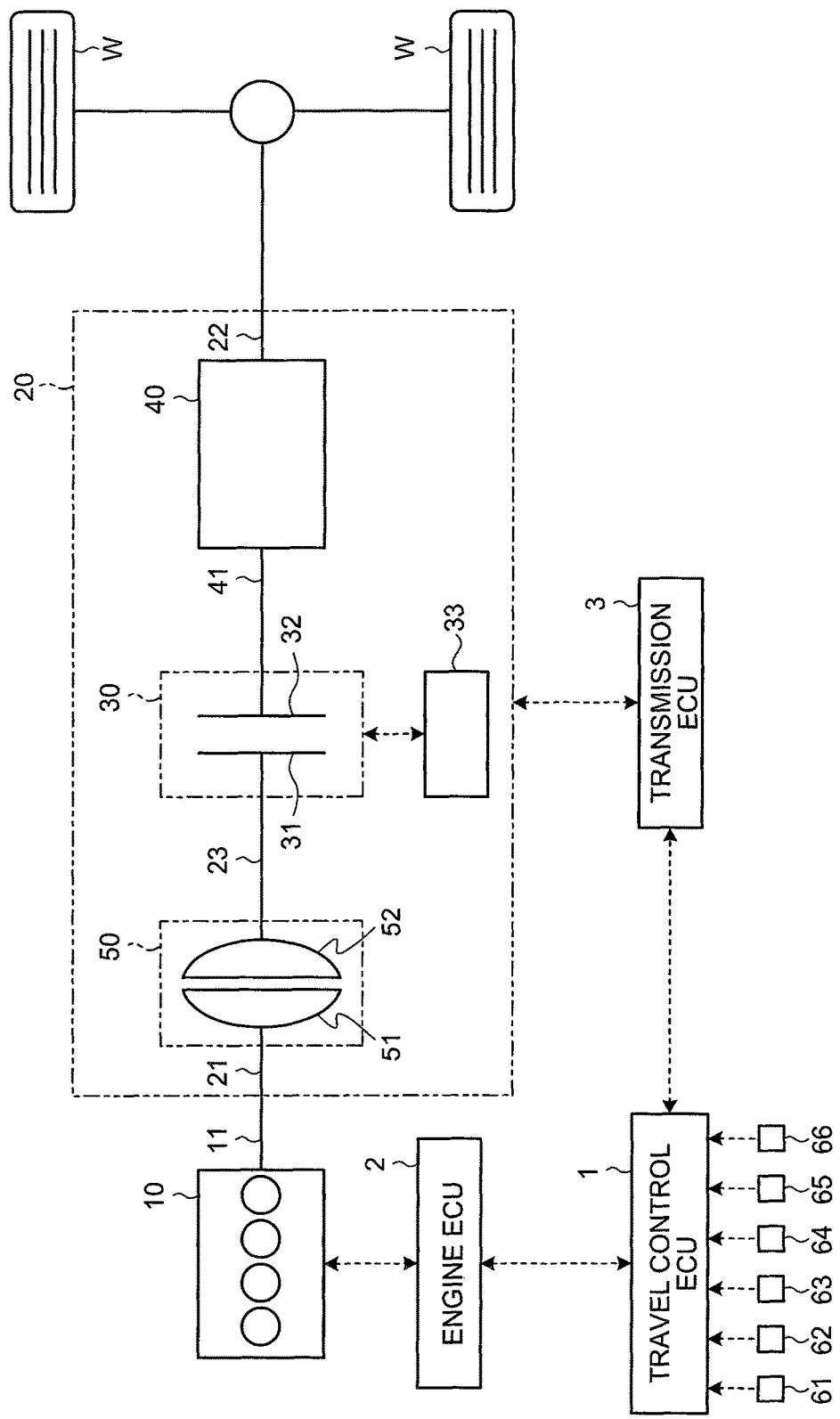
FIG. 1 is a view illustrating a controller of a vehicle according to the invention and the vehicle.

As illustrated in FIG. 1, the vehicle exemplified here includes an engine 10 as a power source and an automatic transmission 20 that transmits the power of the engine 10 to driving wheels W side. Further, the vehicle includes a power connecting/disconnecting device between the engine 10 and the driving wheels W and can disconnect the power transmission therebetween during traveling by controlling the power connecting/disconnecting device.

Further, the vehicle includes, as controllers, an electronic controller that carries out the control relating to a travel of the vehicle (hereinafter, called "travel control ECU") 1, an electronic controller that controls the engine 10 (hereinafter, called "engine ECU") 2, and an electronic controller that controls the automatic transmission 20 (hereinafter, called "transmission ECU") 3. The travel control ECU 1 receives/transmits the detection information of sensors and a result of calculation, or the like from/to the engine ECU 2 and the transmission ECU 3. Further, the travel control ECU 1 sends a command to the engine ECU 2 and the transmission ECU 3, causes the engine ECU 2 to carry out the control of the engine 10 according to the command, and further causes the transmission ECU 3 to carry out the control of the automatic transmission 20 according to the command.

The engine 10 is an engine such as an internal combustion engine and generates power at an engine rotating shaft 11 by the fuel supplied to the engine.

The power connecting/disconnecting device is disposed between the engine 10 and the driving wheels W (namely, on a transmission path of the power output from the engine 10) so that the power transmission therebetween can be carried out and can be disconnected. In the exemplified vehicle, the power connecting/disconnecting device is disposed to the automatic transmission 20.

As the automatic transmission 20 mounted on the vehicle, not only, for example, an ordinary stepped automatic transmission and continuous variable automatic transmission but also a dual clutch type transmission (dual clutch transmission: DCT), an automatic-gear-shift-possible stepped manual transmission (multi-mode manual transmission: MMT), or the like are included as an object to which the automatic transmission is applied. The embodiment will be explained exemplifying the continuous variable automatic transmission.

The automatic transmission 20 of the embodiment includes a clutch 30 operating as the power connecting/disconnecting device, a transmission main body 40 as an automatic gear shift portion, and a torque converter 50 that transmits the power of the engine 10 to the transmission main body 40.

In the automatic transmission 20, a transmission input shaft 21 is coupled with the engine rotating shaft 11 and a transmission output shaft 22 is coupled with the driving wheels W sides. The transmission input shaft 21 is connected so as to be able to rotate integrally with a pump impeller 51 of the torque converter 50. In contrast, an intermediate shaft 23 is connected to a turbine runner 52 of the torque converter 50 so as to be able to rotate integrally therewith. The intermediate shaft 23 is further connected to a first engaging portion 31 of the clutch 30 so as to be able to rotate integrally therewith. A second engaging portion 32 of the clutch 30 is connected so as to be able to rotate integrally with an input shaft 41 of the transmission main body 40. The transmission main body 40 is connected also to a transmission output shaft 22. Namely, in the vehicle, when a power transmission path is sequentially observed from the engine 10 side, the engine 10, the torque converter 50, the clutch 30, the transmission main body 40, and the driving wheels W are sequentially disposed in this order. Note that the torque converter 50 includes also a lock up clutch (illustration omitted).

The transmission main body 40 exemplified here includes, for example, a belt-type continuous variable transmission, a primary side is connected to the input shaft 41 and a secondary side is connected to the transmission output shaft 22. A gear shift control portion of the transmission ECU 3 steplessly switches a gear ratio by controlling the belt-type continuous variable transmission.

The clutch 30 is a friction clutch that has the first engaging portion 31 and the second engaging portion 32 connected to the engine 10 side and the transmission main body 40 side, respectively on the power transmission path and is provided with a friction member disposed to at least one of the first engaging portion 31 and the second engaging portion 32. In the clutch 30, a hydraulic fluid supplied to at least one of the first engaging portion 31 and the second engaging portion 32 causes the first engaging portion 31 and the second engaging portion 32 to be in contact with each other and to be placed in an engaged state. In the engaged state (a semi-engaged state and a completely engaged state to be described later), the power transmission between the engine 10 and the transmission main body 40 (namely, the power transmission between the engine 10 and the driving wheels W) becomes possible. In contrast, in the clutch 30, discharging the hydraulic fluid supplied thereto separates the first engaging portion 31 and the second engaging portion 32 from each other and places the first engaging portion 31 and the second engaging portion 32 in a released state. In the released state, the power transmission between the engine 10 and the transmission main body 40 (between the engine 10 and the driving wheels W) is disconnected.

The clutch 30 causes an actuator 33 to carry out an engagement operation or a release operation between the first engaging portion 31 and the second engaging portion 32. The actuator 33 is provided with, for example, an electromagnetic valve (illustration omitted) that operates in response to a command of a clutch control portion of the transmission ECU 3 and adjusts the hydraulic pressure of the hydraulic fluid supplied to the clutch 30 by the opening/closing operation of the electromagnetic valve.

The clutch 30 is placed in the engaged state by opening the electromagnetic valve and increasing the supplied hydraulic pressure. The clutch control portion adjusts the hydraulic pressure (pressure increasing amount) supplied to the clutch 30 by adjusting the valve opening amount of the electromagnetic valve so that the semi-engaged state and the completely engaged state can be separately created. The semi-engaged state is an engaged state in which a slip is allowed between the first engaging portion 31 and the second engaging portion 32. In contrast, the completely engaged state is an engaged state in which the slip between the first engaging portion 31 and the second engaging portion 32 is not allowed and the first engaging portion 31 and the second engaging portion 32 are rotated each other integrally even if torque is input to at least one of the first engaging portion 31 and the second engaging portion 32. The clutch control portion half-engages the clutch 30 by increasing the supplied hydraulic pressure to a pressure within a predetermined range and completely engages the clutch 30 by more increasing the supplied hydraulic pressure than the highest pressure in the predetermined range. Further, the clutch 30 is placed in the released state by closing the electromagnetic valve and reducing the supplied hydraulic pressure.

Next, a calculation processing of the controller will be explained.

The vehicle of the embodiment can travel by inertia (inertia traveling) by disconnecting the power transmission between the engine 10 and the driving wheels W. Thus, the travel control ECU 1 has an inertia control unit that is caused to execute a control relating to the inertia traveling (hereinafter, called "inertia control"). The inertia control unit disconnects the power transmission between the engine 10 and the driving wheels W during traveling by releasing the clutch 30 during normal traveling. The normal traveling is a state that traveling is carried out by transmitting the power of the engine 10 to the driving wheels W. The travel control ECU 1 has a travel mode switching portion that switches between a normal traveling mode and an inertia traveling mode.

The exemplified vehicle can carry out, as the inertia traveling, at least one of neutral inertia traveling (hereinafter, called "N inertia traveling"), deceleration stop & start traveling (hereinafter, called "deceleration S & S traveling"), and free-run traveling. Thus, the travel control ECU 1 is provided, as the inertia control unit, with at least one of an N inertia control unit, a deceleration S & S control portion, and a free-run control portion according to the inertia traveling mode disposed to the vehicle. Here, all of the N inertia traveling, the deceleration S & S traveling, and the free-run traveling can be carried out.

The N inertia traveling is the inertia traveling that is carried out by operating the engine 10 while disconnecting the power transmission between the engine 10 and the driving wheels W. The N inertia traveling is executed in a state that a driver operates a brake (accelerator off & brake on).

The deceleration S & S traveling and the free-run traveling are the inertia traveling that is executed by disconnecting the power transmission between the engine 10 and the driving wheels W and further stopping the engine 10. The deceleration S & S traveling is carried out in a state that the driver carries out a brake operation (accelerator off & brake on) when a driver's own vehicle is in deceleration travels at a low speed equal to or less than a predetermined vehicle speed. In contrast, the free-run traveling is executed in a state that the driver carries out neither an accelerator operation nor a brake operation (accelerator off & brake off).

Note that the travel control ECU 1 is connected with an accelerator operation amount sensor 61 and a brake operation amount sensor 62. The accelerator operation amount sensor 61 detects an accelerator opening degree, and the like by the driver. Thus, the travel control ECU 1 can grasp the accelerator off state (accelerator off operation) and the accelerator on state (accelerator on operation) of the driver. Further, the brake operation amount sensor 62 detects the brake depression amount and the like by the driver. Thus, the travel control ECU 1 can grasp the brake off state (brake off operation) and the brake on state (brake on operation) of the driver. To grasp the brake off state (brake off operation) and the brake on state (brake on operation) of the driver, the detection signal of a stop lamp switch (illustration omitted) operated in association with the brake operation of the driver may be used.

When the travel mode switching portion detects the accelerator off state (accelerator off operation) and the brake on state (brake on operation) of the driver during normal traveling, the travel mode switching portion can select, as the inertia traveling mode, an N inertia mode or a deceleration S & S mode. At the time of selection, the travel mode switching portion selects any one of the N inertia mode and the deceleration S & S mode according to, for example, the gradient of the travel path and the vehicle speed of the driver's own vehicle. The gradient of the travel path of the driver's own vehicle is detected by a gradient sensor 63. As the gradient sensor 63, a forward/rearward acceleration sensor that detects the vehicle acceleration in a forward/rearward direction may be used. Further, the vehicle speed of the driver's own vehicle is detected by a vehicle speed sensor 64. The gradient sensor 63 and the vehicle speed sensor 64 are connected to the travel control ECU 1.

When the N inertia mode is selected, the N inertia control unit sends a command to the engine ECU 2 and the transmission ECU 3 and controls the engine 10 in, for example, an idle state and causes the clutch control portion to release the clutch 30. With the operation, the vehicle disconnects the power transmission between the engine 10 and the driving wheels W while operating the engine 10 and starts the N inertia traveling. In contrast, when the deceleration S & S mode is selected, the deceleration S & S control portion sends a command to the engine ECU 2 and the transmission ECU 3 and instructs to stop the engine 10 and to release the clutch 30. With the operation, the vehicle stops the engine 10 and disconnects the power transmission between the engine 10 and the driving wheels W and starts the deceleration S & S traveling in a state that the brake on operation is carried out in a predetermined vehicle speed region.

Further, when the travel mode switching portion detects the accelerator off state (accelerator off operation) and the brake off state of the driver during normal traveling, the travel mode switching portion can select the free-run mode as the inertia traveling mode. When the free-run mode is selected, the free-run control portion sends a command similar to the deceleration S & S mode to the engine ECU 2 and the transmission ECU 3 and instructs to stop the engine 10 and to release the clutch 30. With the operation, since neither the accelerator operation nor the brake operation is carried out to the vehicle, the vehicle starts the free-run traveling by stopping the engine 10 and disconnecting the power transmission between the engine 10 and the driving wheels W.

When a return condition to the normal traveling is established during any of the inertia travelings, the travel mode switching portion selects the normal traveling mode. The case that the return condition is established is a case, for example, that the accelerator on state (accelerator on operation) of the driver is detected and the like. When the normal traveling mode is selected, a return control unit of the travel control ECU 1 sends a command according to the inertia traveling mode being carried out to the engine ECU 2 and the transmission ECU 3 and causes the inertia traveling to return to the normal traveling. In the return control, even if the return is carried out from any inertia traveling mode, the clutch 30 in the release state is engaged and the power transmission between the engine 10 and the driving wheels W is made possible.

Figure 2:
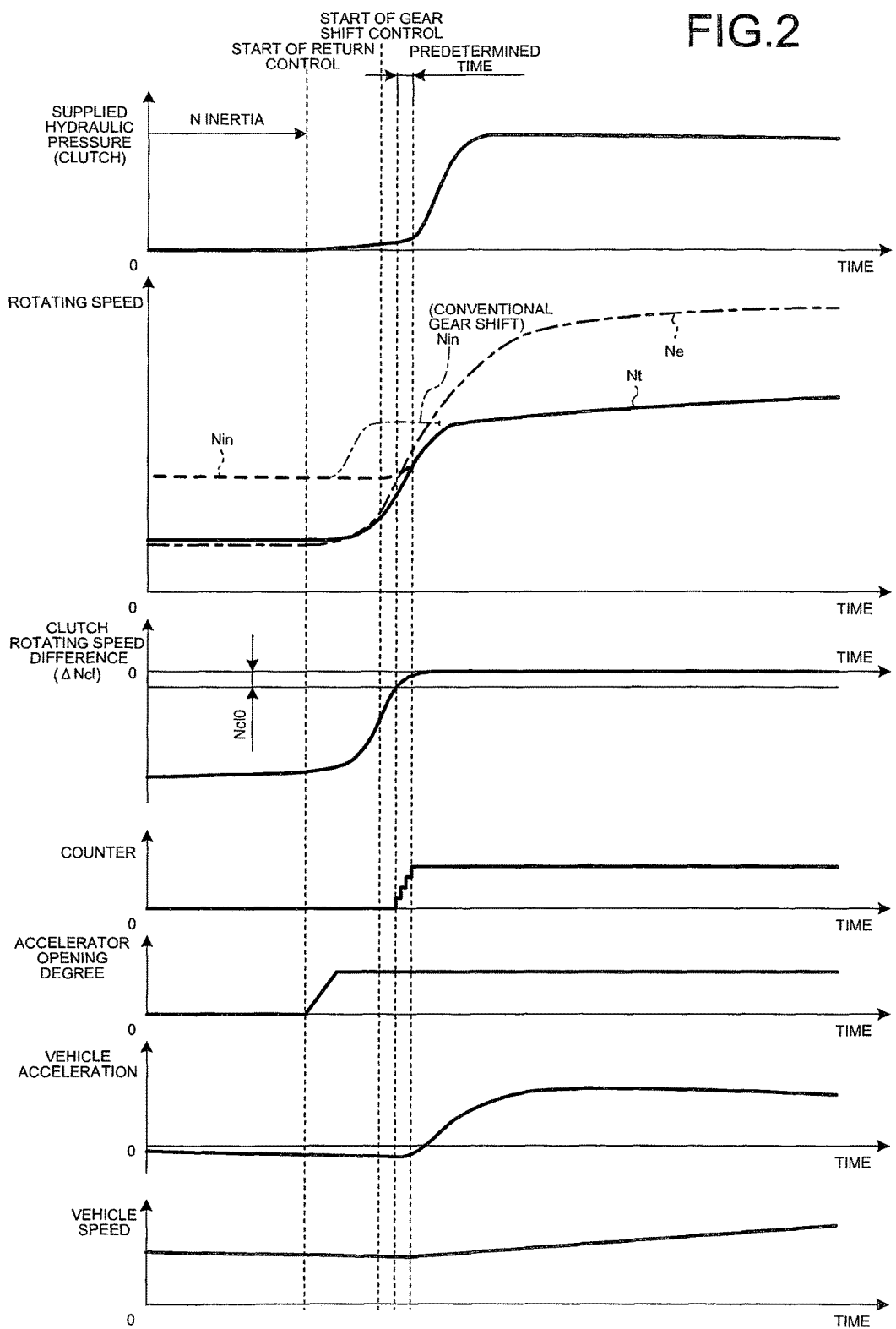
FIG. 2 is an example of a time chart when inertia travelling is returned to normal traveling.
Figure 3:
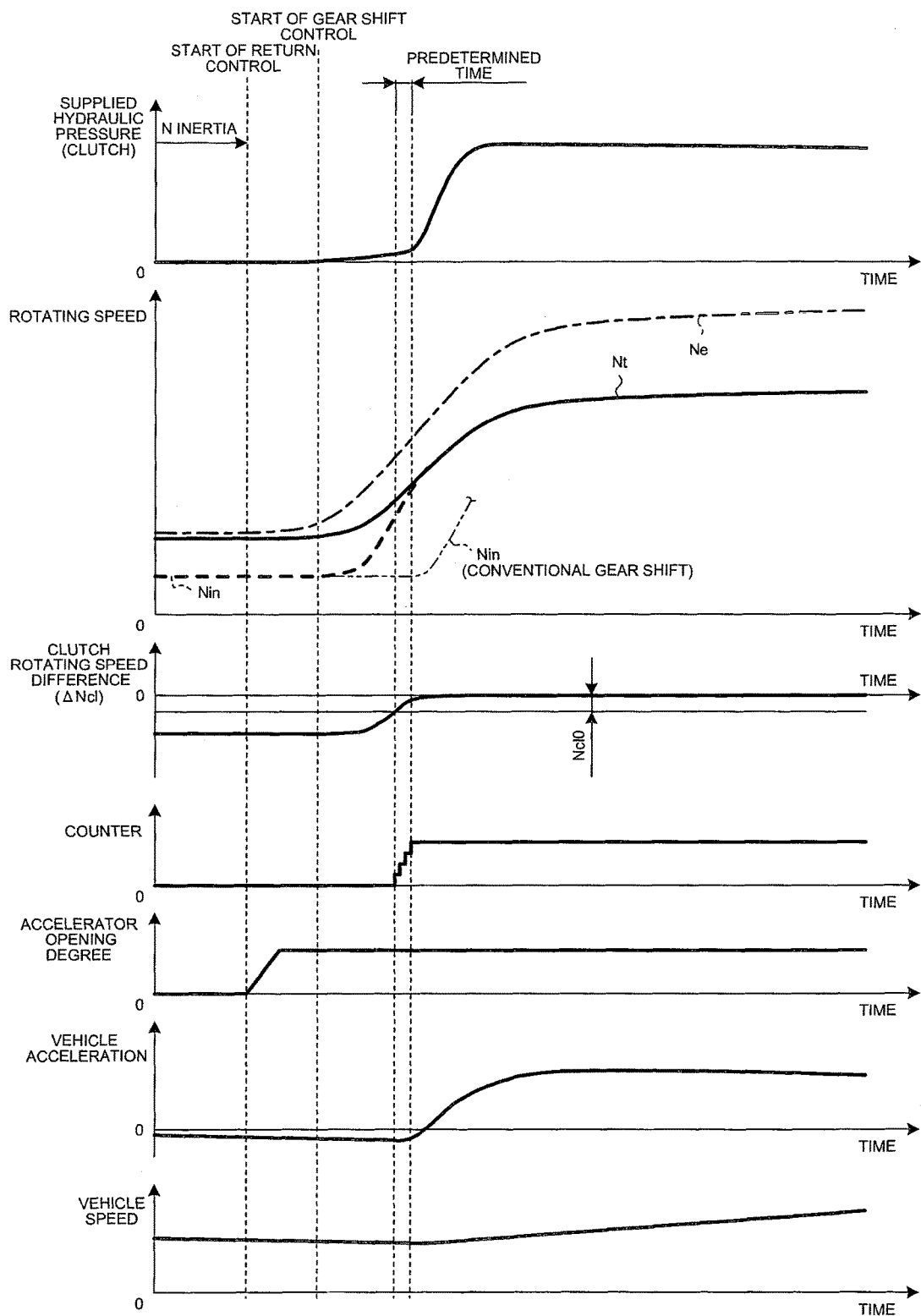
FIG. 3 is other example of the time chart when the inertia traveling is returned to the normal traveling.

During inertia traveling, a difference occurs between the rotating speed of the turbine runner 52 (hereinafter, called "turbine rotating speed") Nt and the rotating speed of the input shaft 41 of the transmission main body 40 (hereinafter, called "input rotating speed") Nin, i.e. between the rotating speed of the first engaging portion 31 and the rotating speed of the second engaging portion 32 in the clutch 30. For example, during inertia traveling at a high vehicle speed, the input rotating speed Nin (=the rotating speed of the second engaging portion 32) becomes higher than the turbine rotating speed Nt (=the rotating speed of the first engaging portion 31) (FIG. 2). In contrast, during inertia traveling at a low vehicle speed, the turbine rotating speed Nt (=the rotating speed of the first engaging portion 31) may become higher than the input rotating speed Nin (=the rotating speed of the second engaging portion 32) (FIG. 3). Thus, in the clutch 30, when the supplied hydraulic pressure is increased until a complete engagement is achieved at the time the difference between the rotating speed of the first engaging portion 31 and the rotating speed of the second engaging portion 32 (hereinafter, called "clutch rotating speed difference") ΔNcl is large, shock is generated because an engagement operation is carried out abruptly. Note that FIG. 2 and FIG. 3 are time charts illustrating the return from the N inertia traveling. Further, in the following description, the state that the input rotating speed Nin (=the rotating speed of the second engaging portion 32) is higher than the turbine rotating speed Nt (=the rotating speed of the first engaging portion 31) is called also "first clutch state", whereas the state that the turbine rotating speed Nt (=the rotating speed of the first engaging portion 31) is higher than the input rotating speed Nin (=the rotating speed of the second engaging portion 32) is called also "second clutch state".

The turbine rotating speed Nt (=the rotating speed of the first engaging portion 31) can be estimated from the engine rotating speed Ne and the speed ratio of the torque converter 50 using the detection signal of a crank angle sensor 65 of the engine 10. To detect the turbine rotating speed Nt (=the rotating speed of the first engaging portion 31), a rotation sensor (illustration omitted) that detects the rotation angle of the turbine runner 52 or the first engaging portion 31 may be provided. Further, the input rotating speed Nin (=the rotating speed of the second engaging portion 32) can be estimated from the rotating speed of the rotation sensor 66 that detects the rotation angle of the transmission output shaft 22 and the gear ratio of the transmission main body 40 using the signal detected by the rotation sensor 66. To detect the input rotating speed Nin (=the rotating speed of the second engaging portion 32), a rotation sensor (illustration omitted) that detects the rotation angle of the input shaft 41 or the second engaging portion 32 may be provided.

To suppress the generation of shock when the clutch is engaged, the return control unit sends a command to the engine ECU 2 and the transmission ECU 3 and reduces the clutch rotating speed difference ΔNcl by the output control of the engine 10 (including also the start control of the engine 10 in the deceleration S & S traveling and the free-run traveling) and the gear shift control of the automatic transmission 20. When, for example, the return condition to the normal traveling is established during inertia traveling in the first clutch state, the engine rotating speed Ne is increased by the output control of the engine 10 in the return control, thereby causing the turbine rotating speed Nt (=the rotating speed of the first engaging portion 31) to approach the input rotating speed Nin (=the rotating speed of the second engaging portion 32) while increasing the turbine rotating speed Nt (=the rotating speed of the first engaging portion 31). Further, when the return condition to the normal traveling is established during inertia traveling in the second clutch state, the input rotating speed Nin is increased by a down shift control of the automatic transmission 20, thereby causing the input rotating speed Nin (=the rotating speed of the second engaging portion 32) to approach the turbine rotating speed Nt (=the rotating speed of the first engaging portion 31). When the turbine rotating speed Nt (=the rotating speed of the first engaging portion 31) is synchronized with the input rotating speed Nin (=the rotating speed of the second engaging portion 32) or when it can be regarded that the turbine rotating speed Nt is synchronized with the input rotating speed Nin, the return control unit completely engages the clutch 30.

When the difference (the clutch rotating speed difference ΔNcl) between the turbine rotating speed Nt (=the rotating speed of the first engaging portion 31) and the input rotating speed Nin (=the rotating speed of the second engaging portion 32) becomes equal to or less than a predetermined rotating speed Ncl0 and this state continues for a predetermined time, it can be regarded that the turbine rotating speed Nt is synchronized with the input rotating speed Nin. Note that when the clutch rotating speed difference ΔNcl has a positive value, the predetermined rotating speed Ncl0 becomes positive, whereas when the clutch rotating speed difference ΔNcl has a negative value, the predetermined rotating speed Ncl0 becomes negative.

In the exemplification, the clutch rotating speed difference ΔNcl when a predetermined time passes after the clutch rotating speed difference ΔNcl becomes equal to or less than the predetermined rotating speed Ncl0 becomes the rotating speed that allows to start a complete engagement control of the clutch 30 (hereinafter, called "completely engageable rotating speed"). The completely engageable rotating speed is the clutch rotating speed difference ΔNcl that makes it possible to carry out the complete engagement operation of the clutch 30 while suppressing shock equal to or less than a predetermined magnitude. The predetermined magnitude is such a magnitude that even if the shock generated by the clutch 30 is transmitted to the driving wheels W and the vehicle body, an occupant cannot feel the shock.

The predetermined time is changed according to, for example, the gear ratio of the transmission main body 40 at the time of the return control. Specifically, a larger gear ratio of the transmission main body 40 at the time of the return control (namely, a lower gear) makes the input rotating speed Nin (=the rotating speed of the second engaging portion 32) higher than the turbine rotating speed Nt (=the rotating speed of the first engaging portion 31). Thus, a larger gear ratio of the transmission main body 40 (namely, a lower gear) at the time of the return control sets the predetermined time longer. With the operation, the controller can increase the determination accuracy for determining whether or not the complete engagement control of the clutch 30 is possible and can suppress the generation of shock of the clutch 30 when the clutch 30 is completely engaged. For example, the return control unit checks a current gear ratio with a previously prepared map, reads the predetermined time according to the gear ratio, and sets the predetermined time.

The predetermined rotating speed Ncl0 is determined by the backcalculation from the completely engageable rotating speed and the predetermined time. For example, when the return condition to the normal traveling is established during inertia traveling, the return control unit is caused to estimate the clutch rotating speed difference ΔNcl in the future based on the vehicle speed of the driver's own vehicle, the vehicle acceleration of the driver's own vehicle, the gear ratio of the transmission main body 40, the change of the engine rotating speed Ne, the turbine rotating speed Nt (=the rotating speed of the first engaging portion 31), the input rotating speed Nin (=the rotating speed of the second engaging portion 32), and the like. The return control unit determines the point of time at which the estimated clutch rotating speed difference ΔNcl becomes the completely engageable rotating speed and determines the clutch rotating speed difference ΔNcl at the time a predetermined time before the above point of time as the predetermined rotating speed Ncl0.

Incidentally, when the driver desires to generate a large drive force by the accelerator operation, the travel control ECU 1 may request the down shift to the automatic transmission 20 to achieve the desired drive force. Thus, when the return condition from the inertia traveling to the normal traveling is established, the down shift of the automatic transmission 20 may be requested therewith depending on the accelerator operation amount of the driver.

A case that the return from the inertia traveling in the first clutch state is requested and the down shift of the automatic transmission 20 is requested will be explained. As one of the control forms in the case, it is conceived to carry out the down shift at an earlier stage before the clutch 30 is completely engaged. In the control form, the complete engagement control of the clutch 30 is carried out by causing the turbine rotating speed Nt (=the rotating speed of the first engaging portion 31) that is increasing to approach the input rotating speed Nin (=the rotating speed of the second engaging portion 32). However, since the input rotating speed Nin (=the rotating speed of the second engaging portion 32) is increased due to the down shift, more time is required until the clutch 30 is synchronized or it can be regarded that the clutch 30 is synchronized as compared with a case that no down shift is requested. Thus, in the control form, since the time is necessary until the power of the engine 10 is transmitted to the driving wheels W, there is a possibility that the driver has uncomfortable feelings as to the slowness of acceleration of the vehicle to the accelerator operation. To remove the uncomfortable feelings of the driver, there is conceived a control form for completely engage the clutch 30 previous to the down shift of the automatic transmission 20. However, in the control form, since the power of the engine 10 starts to be transmitted to the driving wheels W when the gear ratio is small before the down shift (at the time of a high gear), the drive force according to the accelerator operation cannot be generated until the down shift is finished so that there is a possibility that the driver has uncomfortable feelings eventually as to the slowness of acceleration of the vehicle due to the insufficient drive force at the time of high gear. Further, in the control forms, the clutch 30 is completely engaged when the rotating speed of the first engaging portion 31 that is increasing and the rotating speed of the second engaging portion 32 that is decreasing are synchronized or when it can be regarded that the rotating speed of the first engaging portion 31 and the rotating speed of the second engaging portion 32 are synchronized. Namely, in the control forms, the clutch 30 is completely engaged in a state that the gradients of change of the rotating speeds of the first engaging portion 31 and the second engaging portion 32 are largely different. Thus, in the control forms, it is difficult to suppress the generation of shock when the clutch 30 is completely engaged.

Further, when the inertia traveling in the second clutch state is returned, the down shift may be requested as described above to suppress the generation of shock when the clutch 30 is engage regardless that the down shift is requested or not due to the accelerator operation of the driver. Thus, a case that the return from the inertia traveling in the second clutch state is requested and the down shift of the automatic transmission 20 is requested will be explained. As one of the control forms in the case, it is conceived to carry out the down shift at an earlier stage before the complete engagement of the clutch 30. In the control form, since the complete engagement control of the clutch 30 is carried out by causing the input rotating speed Nin (=the rotating speed of the second engaging portion 32) that is increasing due to the down shift to approach the turbine rotating speed Nt (=the rotating speed of the first engaging portion 31) that is increasing, the timing of the complete engagement can be brought forward so that the power of the engine 10 can be transmitted to the driving wheels W at an earlier stage. However, at the time, since the clutch 30 is completely engaged in a state that the power of the engine 10 is small, there is a possibility that the driver has uncomfortable feelings as to the slowness of acceleration of the vehicle due to the insufficient drive force. To remove the uncomfortable feelings of the driver, there is conceived a control form for delaying the timing of down shift. However, when the timing of down shift is excessively delayed, since the time until the input rotating speed Nin (=the rotating speed of the second engaging portion 32) approaches the turbine rotating speed Nt (=the rotating speed of the first engaging portion 31) extends, a time is required until the clutch 30 is synchronized or it can be regarded that the clutch 30 is synchronized. Thus, in the control form, since a time is required until the power of the engine 10 is transmitted to the driving wheels W, there is a possibility that the driver has uncomfortable feelings as to the slowness of acceleration of the vehicle. Further, in the control forms, since the clutch 30 may be completely engaged in a state that the gradients of change of the rotating speeds of the first engaging portion 31 and the second engaging portion 32 are largely different, it is difficult to suppress the generation of shock when the clutch 30 is completely engaged.

Thus, when the return condition to the normal traveling is established during inertia traveling and the down shift of the automatic transmission 20 is requested, the return control unit starts the return control to the normal traveling and carries out the down shift control of the automatic transmission 20 so that the increasing gradient of the input rotating speed Nin (=the rotating speed of the second engaging portion 32) due to the down shift is synchronized with the increasing gradient of the turbine rotating speed Nt (=the rotating speed of the first engaging portion 31) due to the return control. When the turbine rotating speed Nt (=the rotating speed of the first engaging portion 31) and the input rotating speed Nin (=the rotating speed of the second engaging portion 32) are synchronized or when it can be regarded that the turbine rotating speed Nt and the input rotating speed Nin are synchronized, the return control unit completely engages the clutch 30.

Specifically, the travel control ECU 1 is provided with a gear shift timing calculating unit that calculates the start timing of the down shift control. The gear shift timing calculating unit calculates a start timing of the down shift control for synchronizing the increasing gradient of the input rotating speed Nin (=the rotating speed of the second engaging portion 32) due to the down shift with the increasing gradient of the turbine rotating speed Nt (=the rotating speed of the first engaging portion 31) due to the return control.

First, the gear shift timing calculating unit is caused to estimate the increasing gradient of the turbine rotating speed Nt (=the rotating speed of the first engaging portion 31) due to the return control. The increasing gradient changes according to the engine rotating speed Ne during the return control. Thus, the gear shift timing calculating unit is caused to estimate the change of the engine rotating speed Ne based on the control contents of the output control of the engine 10 during the return control and is caused to estimate the increasing gradient of the turbine rotating speed Nt (=the rotating speed of the first engaging portion 31) based on the change of the engine rotating speed Ne.

Next, the gear shift timing calculating unit is caused to estimate the increasing gradient of the input rotating speed Nin (=the rotating speed of the second engaging portion 32) due to the down shift based on, for example, the changing gradient of the vehicle speed using the vehicle speed of the driver's own vehicle at present time (for example, at the time of start of the return control) as a base point (or the changing gradient of a wheel speed using the wheel speeds of the driving wheels at present time as the base point), the gear ratio of the automatic transmission 20 at present time, and the gear ratio of the automatic transmission 20 after the down shift. The changing gradient of the vehicle speed (or the wheel speed) can be estimated based on the gradient of a travel path and on the changing gradient of the vehicle speed (or the wheel speed) during inertia traveling up to present time. For example, the gear shift timing calculating unit estimates the increasing gradient of the input rotating speed Nin (=the rotating speed of the second engaging portion 32) due to the down shift for a time period until a predetermined time passes from the present time at every predetermined interval. The predetermined interval is, for example, the calculation cycle of the travel control ECU 1, and the like. Namely, the gearshift timing calculating unit shifts the start timing of the down shift control sequentially from the present time and estimates the increasing gradient of the input rotating speed Nin (=the rotating speed of the second engaging portion 32) due to the down shift according to respective start timings.

The gear shift timing calculating unit is caused to select an increasing gradient that is synchronized with the increasing gradient of the turbine rotating speed Nt (=the rotating speed of the first engaging portion 31) from the respective estimated increasing gradients and is caused to read the start timing of the down shift control corresponding to the selected increasing gradient. The gear shift timing calculating unit calculates the start timing of the down shift control as described above based on the increasing gradient of the turbine rotating speed Nt (=the rotating speed of the first engaging portion 31) due to the output control of the engine 10 in the return control, the changing gradient of the vehicle speed using the vehicle speed of the driver's own vehicle at present time (for example, at the time of start of the return control start) as a base point (or the changing gradient of the wheel speed using the wheel speeds of the driving wheels of the present time as the base point), the gear ratio of the automatic transmission 20 at present time, and the gear ratio of the automatic transmission 20 after the down shift. At the time of selection, when even a part of the respective increasing gradients is synchronized, it is determined that the respective increasing gradients are synchronized. Further, the synchronization in the case includes not only a case that a part of the respective increasing gradients is perfectly agreed but also a case that a difference between the respective increasing gradients is within a predetermined range. The state that the difference between the respective increasing gradients is within the predetermined range is, for example, such a state that even if the shock generated by completely engaging the clutch 30 in the state is transmitted to the driving wheels W and the vehicle body, the occupant cannot feel the shock. Thus, when the clutch rotating speed difference $\Delta Ncl$ is reduced equal to or less than the predetermined rotating speed Ncl0 and the state that the clutch rotating speed difference is equal to or less than the predetermined rotating speed Ncl0 continues a predetermined time, the gear shift timing calculating unit can determine that the difference between the respective increasing gradients is within the predetermined range.

Figure 4:
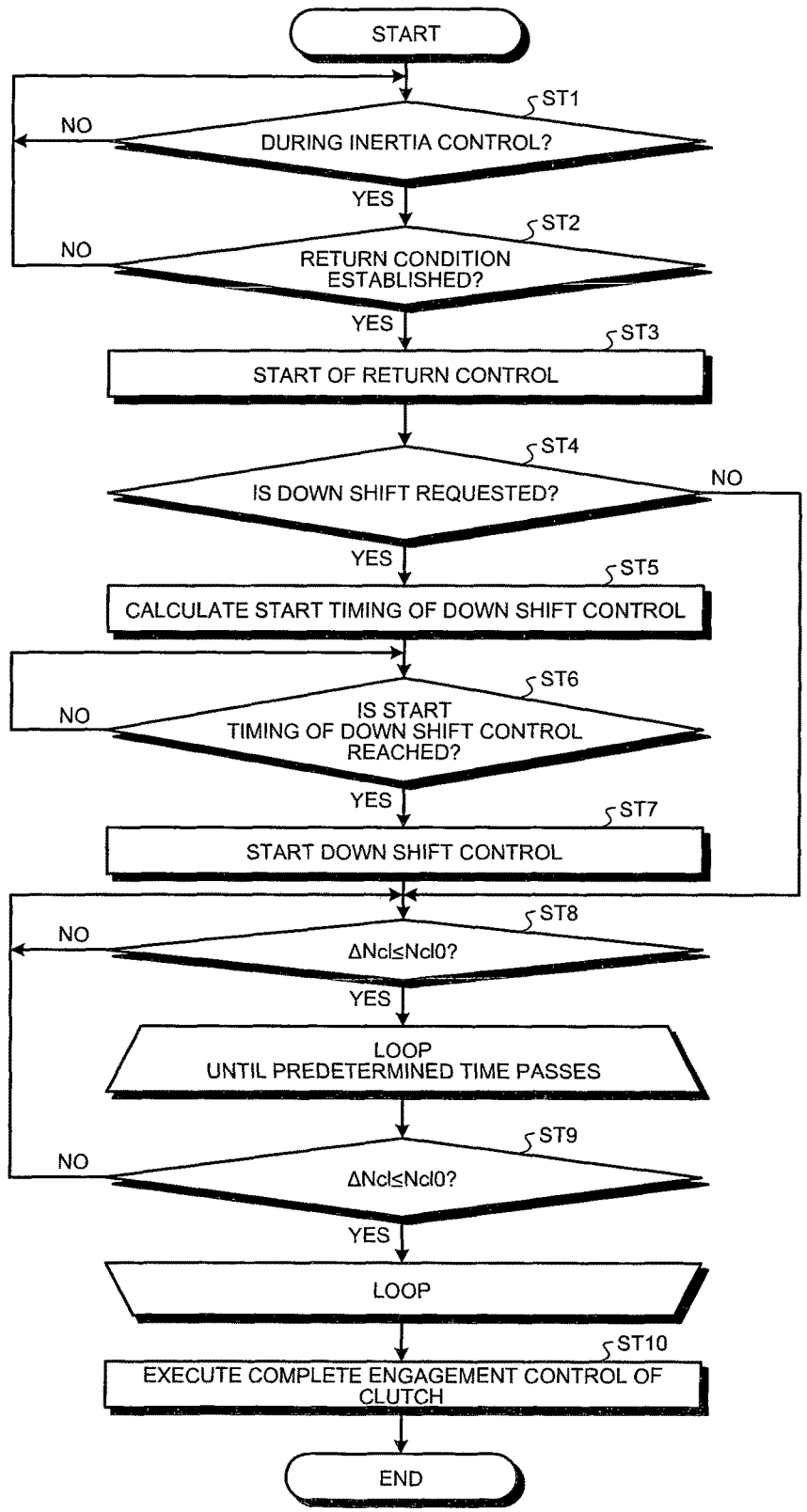
FIG. 4 is a flowchart when the inertia traveling is returned to the normal traveling.

A calculation process when the inertia traveling is returned to the normal traveling will be explained below based on a flowchart of FIG. 4.

The return control unit determines whether or not the inertia control is being carried out (step ST1). In the exemplified vehicle, whether or not even any one of the N inertia control, the deceleration S & S control, and the free-run control is being executed is determined. When any of the controls is not executed, the return control unit determines that the inertia control is not being carried out and repeats the calculation process.

When the inertia control is being carried out, the return control unit determines whether or not the return condition from the inertia traveling to the normal traveling is established (step ST2). When the return condition is not established, the return control unit returns to step ST1.

When the return condition is established, the return control unit causes the return control from the inertia traveling to the normal traveling according to the inertia traveling mode that is being executed to be started (step ST3).

Specifically, in the case of return from the N inertia traveling, the return control unit sends a command to the engine ECU 2 and causes the output control of the engine 10 according to the accelerator opening degree of the driver to be started. In the case of return from the deceleration S & S traveling and the free-run traveling, the return control unit sends a command to the engine ECU 2 and causes the engine 10 being stopped to be restarted. When the return control is carried out, the return control unit may send a command to the transmission ECU 3 and increase the hydraulic pressure supplied to the clutch 30 within the range in which a release state is kept in order to increase the responsiveness of an engagement control. In the vehicle, the turbine rotating speed Nt (=the rotating speed of the first engaging portion 31) is increased by starting the return control.

Further, the return control unit determines whether or not the down shift of the automatic transmission 20 is requested (step ST4). When the down shift of the automatic transmission 20 is not requested, the return control unit goes to step ST8 described later.

When the down shift of the automatic transmission 20 is requested, the gear shift timing calculating unit calculates the start timing of the down shift control as, for example, described above (step ST5).

The return control unit determines whether or not the start timing of the down shift control is reached (step ST6). When the start timing of the down shift control is not reached, the return control unit repeats the determination at step ST6.

When the start timing of the down shift control is reached, the return control unit sends a command to the transmission ECU 3 and causes the gear shift control portion to start the down shift control of the transmission main body 40 in the automatic transmission 20 (step ST7).

The return control unit calculates a clutch rotating speed difference $\Delta$Ncl based on the turbine rotating speed Nt (=the rotating speed of the first engaging portion 31) and the input rotating speed Nin (=the rotating speed of the second engaging portion 32) and determines whether or not the clutch rotating speed difference $\Delta$Ncl becomes equal to or less than the predetermined rotating speed Ncl0 described above (step ST8).

When the clutch rotating speed difference $\Delta$Ncl does not become equal to or less than the predetermined rotating speed Ncl0, the return control unit repeats the calculation process at step ST8. When the clutch rotating speed difference $\Delta$Ncl becomes equal to or less than the predetermined rotating speed Ncl0, the return control unit determines whether or not the state that the clutch rotating speed difference $\Delta$Ncl becomes equal to or less than the predetermined rotating speed Ncl0 continues until the predetermined time described above passes (step ST9). At the time, the return control unit starts counting by, for example, a counter and cumulates the counts of respective calculation cycles until the predetermined time passes.

When the state of the clutch 30 does not continue the predetermined time (No at step ST9), the return control unit returns to step ST8 and determines again whether or not the clutch rotating speed difference $\Delta$Ncl becomes equal to or less than the predetermined rotating speed Ncl0.

The negative determination at step ST9 may occur when, for example, the deceleration S & S traveling is returned. When the deceleration S & S traveling is returned to the normal traveling, since the engine 10 being stopped is restarted at the time of low speed travel, there is a possibility that the turbine rotating speed Nt (=the rotating speed of the first engaging portion 31) exceeds the input rotating speed Nin (=the rotating speed of the second engaging portion 32) depending on the rising of the engine rotating speed Ne when the engine restarts. When the turbine rotating speed Nt exceeds the input rotating speed Nin at the time the engine restarts, even if the clutch rotating speed difference $\Delta$Ncl becomes equal to or less than the predetermined rotating speed Ncl0, since the state cannot be continued for the predetermined time, there is a possibility that the negative determination may be made at step ST9. However, the turbine rotating speed Nt is reduced thereafter due to the completion of restart of the engine 10 and approaches the input rotating speed Nin again. Thus, when the deceleration S & S traveling is returned, a positive determination is made again at step ST8 and the process goes to the determination at step ST9.

When the state that the clutch rotating speed difference $\Delta$Ncl is equal to or less than the predetermined rotating speed Ncl0 continues for the predetermined time, the return control unit determines that the complete engagement control of the clutch 30 can be carried out, and sends a command to the transmission ECU 3, and completely engages the clutch 30 (step ST10).

When, for example, the inertia traveling in the first clutch state is returned to the normal traveling, if the return is accompanied with the down shift control of the automatic transmission 20, the down shift control of the automatic transmission 20 is started in accordance with the start timing estimated as described above so that the increasing gradient of the input rotating speed Nin (=the rotating speed of the second engaging portion 32) that starts to increase due to the down shift approaches the increasing gradient of the turbine rotating speed Nt (=the rotating speed of the first engaging portion 31) that is being increasing by the return control (FIG. 2). When the synchronization of the respective increasing gradients are detected, the clutch 30 is completely engaged. Namely, the controller synchronizes the increasing gradient of the input rotating speed Nin (=the rotating speed of the second engaging portion 32) with the increasing gradient of the turbine rotating speed Nt (=the rotating speed of the first engaging portion 31) by starting the down shift control at the optimized start timing. In other words, the controller does not wait that the turbine rotating speed Nt (=the rotating speed of the first engaging portion 31) that is increasing due to the return control catches up with the input rotating speed Nin (=the rotating speed of the second engaging portion 32) that is increasing due to the down shift. Further, likewise the above-described case, as to also the case that the inertia traveling in the second clutch state is returned to the normal traveling, starting the down shift control of the automatic transmission 20 in agreement with the start timing estimated as described above causes the increasing gradient of the input rotating speed Nin (=the rotating speed of the second engaging portion 32) that starts to increase due to the down shift to approach the increasing gradient of the turbine rotating speed Nt (=the rotating speed of the first engaging portion 31) that is increasing due to the return control (FIG. 3). Thus, even in any of the cases, in the clutch 30, a waiting time from the time at which the return control starts to the time at which the clutch 30 can be completely engaged is more reduced than the conventional case while suppressing the generation of shock due to the complete engagement. As a result, since the controller can more reduce the time until the power of the engine 10 is transmitted to the driving wheels W than the conventional case, the slowness of acceleration of the vehicle to the accelerator operation of the driver can be suppressed thereby. Further, since the controller can generate the drive force according to the accelerator operation when the clutch 30 is completely engaged while reducing the time, the slowness of acceleration of the vehicle to the accelerator operation can be suppressed also thereby.

As described above, when the down shift control of the automatic transmission 20 is also requested at the time of return from the inertia traveling to the normal traveling, the controller completely engages the clutch 30 as earlier as possible (namely, when the rotating speeds of the first engaging portion 31 and the second engaging portion 32 are low) when the increasing gradients of the respective rotating speeds of the first engaging portion 31 and the second engaging portion 32 are synchronized. Thus, since the controller can suppress the slowness of acceleration of the vehicle to the accelerator operation of the driver while suppressing the generation of shock when the clutch 30 is completely engaged, the uncomfortable feelings felt by the driver when the inertia traveling is returned to the normal traveling can be reduced. Further, when the clutch 30 is completely engaged, since the controller can reduce the slip control time of the clutch 30 and can reduce a calorific value, the controller can suppress the deterioration of durability of the clutch 30.

REFERENCE SIGNS LIST 1 travel control ECU
2 engine ECU
3 transmission ECU
10 engine
20 automatic transmission
30 clutch
31 first engaging portion
32 second engaging portion
40 transmission main body
50 torque converter
52 turbine runner
W driving wheel

The invention claimed is:

1. A controller of a vehicle that includes an engine, an automatic transmission, and a power connecting/disconnecting device having a first engaging portion connected to the engine and a second engaging portion connected to the automatic transmission, the controller comprising:
   an inertia control unit configured to cause the vehicle to transition from normal traveling to inertia traveling by disconnecting power transmission between the engine and driving wheels by releasing the power connecting/disconnecting device; and
   a return control unit configured to carry out an output control of the engine and carry out a complete engagement control of the power connecting/disconnecting device at a time a return condition from the inertia traveling to the normal traveling is established, wherein
   at the time the return condition from the inertia traveling to the normal traveling is established and a down shift of the automatic transmission is requested, the return control unit:
      carries out the output control of the engine to increase a rotating speed of the first engaging portion; and
      carries out a down shift control of the automatic transmission while increasing the rotating speed of the first engaging portion so that a difference between an increasing gradient of the rotating speed of the first engaging portion and an increasing gradient of a rotating speed of the second engaging portion due to the down shift of the automatic transmission is within a predetermined range, and
   at a time the rotating speed of the first engaging portion and the rotating speed of the second engaging portion are synchronized or at the time it can be regarded that the rotating speed of the first engaging portion and the rotating speed of the second engaging portion are synchronized, the return control unit completely engages the power connecting/disconnecting device.

2. The controller of the vehicle according to claim 1, further comprising:
   a gear shift timing calculating unit configured to calculate a start timing of the down shift control of the automatic transmission so that the increasing gradient of the rotating speed of the first engaging portion due to the output control of the engine and the increasing gradient of the rotating speed of the second engaging portion due to the down shift of the automatic transmission are synchronized, wherein
   the return control unit starts the down shift control of the automatic transmission at the start timing calculated by the gear shift timing calculating unit.

3. The controller of the vehicle according to claim 1, wherein
   at a time that a difference between the rotating speed of the first engaging portion and the rotating speed of the second engaging portion is equal to or less than a predetermined value has continued for a predetermined time, the return control unit completely engages the power connecting/disconnecting device.

4. The controller of the vehicle according to claim 2, wherein
   at a time that a difference between the rotating speed of the first engaging portion and the rotating speed of the second engaging portion is equal to or less than a predetermined value has continued for a predetermined time, the return control unit completely engages the power connecting/disconnecting device.

* * * * *